United States Patent Office 3,223,236
Patented Dec. 14, 1965

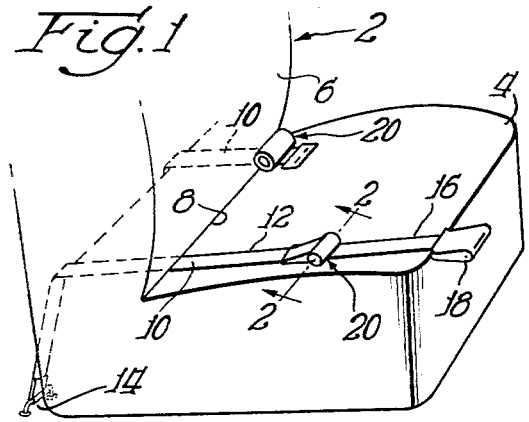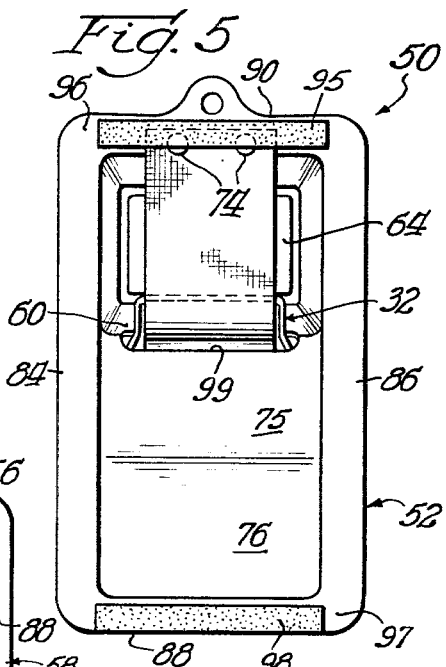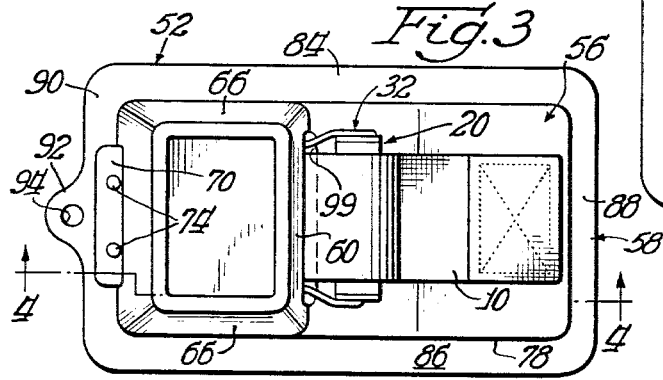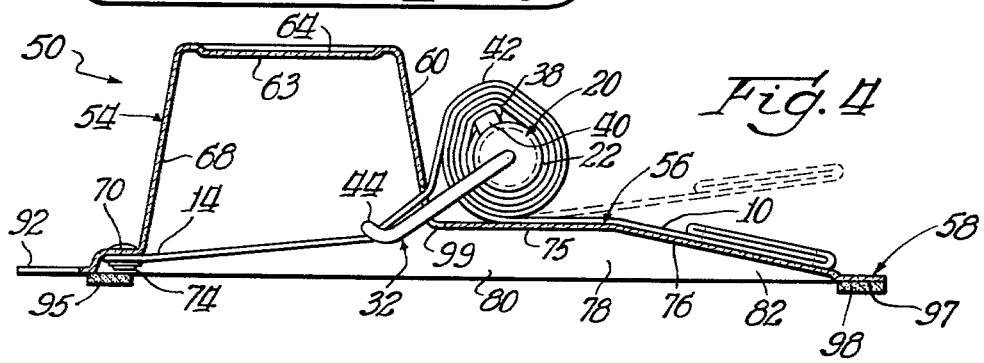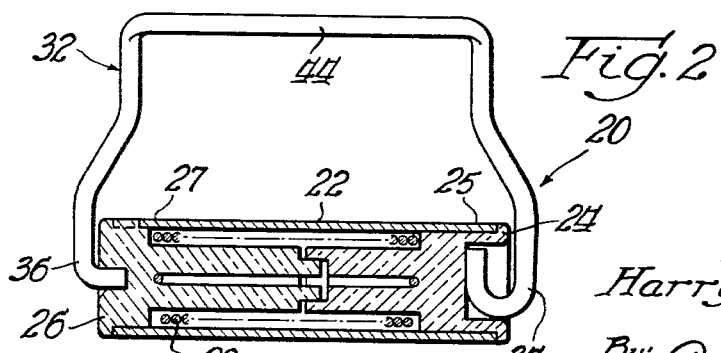

3,223,236
SEAT BELT DEMONSTRATOR
Harry P. Troendly, La Grange Park, Ill., assignor to Borg-Warner Corporation, Chicago, Ill., a corporation of Illinois
Filed Jan. 2, 1964, Ser. No. 335,027
5 Claims. (Cl. 206—82)

This invention relates to a seat belt demonstrator and in particular to a vehicle retractible safety seat belt demonstrator.

In order to acquaint the viewer, user, or audience in the viewing, study and operation of a vehicle seat belt employing a retracting device, a demonstrator is employed as an educational device. The demonstrator of the invention is intended to simulate the mounting in a vehicle a seat belt having a retractor device and allows the user to extend and retract the seat belt much in the fashion he or she would when sitting on the seat of the vehicle.

It is therefore a general object of this invention to provide a seat belt demonstrator that illustrates the functioning of a seat belt in a vehicle and in particular a safety seat belt of the retractible type used in a vehicle.

Another object of this invention is to provide a safety seat belt demonstrator that simulates the assembly of a retractible seat belt and retractor device on a vehicle seat.

Another object of the invention is to provide a vehicle retractible safety seat belt demonstrator that is sturdily constructed for easy operation by the user and does not slip from the surface upon which it rests when being used.

Another object of the invention is to provide a demonstrator of the type described having a stand simulating a vehicle seat or chair in receiving the seat belt and retractor device thereon.

Another object of this invention is to provide a demonstrator stand for a safety seat belt retractor mechanism rolling a safety seat belt into a double ply coil wherein both ends of the belt are taken up on the retractor device together at the same time.

Another object of the invention is to proivide a vehicle safety seat belt demonstrator having a brake means to control speed of belt retraction and being provided with a retractor back stop.

These and other objects will become more readily apparent from reference to the following description and appended drawings:

FIGURE 1 is a perspective view of a vehicle seat having a seat belt means;

FIGURE 2 is a sectional view taken along line 2—2 of FIGURE 1;

FIGURE 3 is top plan view of my invention;

FIGURE 4 is a sectional view taken along line 4—4 of FIGURE 3; and

FIGURE 5 is a bottom plan view of my invention.

Description

With reference now to FIGURE 1 there is shown an auto seat structure 2 having a seat 4 which has a back rest or cushion 6 extending upwardly therefrom and a belt receiving aperture 8 in the juncture between the seat and the back rest and a pair of belt lengths or parts 10, 10 of a seat belt 12 extending through the aperture. The belt lengths 10, 10 each have a rear terminal or anchor end 14 attached to a vehicle floor and a forward end 16 having a coupling portion 18 for attaching the seat belt 12 around the vehicle occupant. Each belt section 10 has a seat belt retractor or roll-up unit 20 which can retract a belt section or permit it to be extended as shown in FIGURE 1.

The retractor mechanism 20 as shown in the drawings and particularly in FIGURE 2, comprises a tubular member or reel 22 having a driver end plug or closure 24 rotatively disposed in one end 25 of the reel or barrel 22 and having an anchor end plug or closure 26 fixed to and extending into the other end 27 of the reel 22. A spring 28 in the barrel 22 connects with both plugs 24, 26 such that the driver plug 24 can wind up the spring when driven by reaction member or arm or bail 32 having one end 34 drivingly connecting with driver plug 24 and the other end 36 rotatively journalled in anchor plug 26, the construction of this retractor mechanism being further described in the co-pending U.S. patent application No. 274,271 to Herbert A. McAnnich and filed April 19, 1963.

The retractor mechanism 20 is held on the belt length 10 at its bight portion 38 by clamp structure 40 of the reel 22 in fixed position but out of the line of pull of the belt when the belt length 10 is fully extended. The mechanism 20 allows the belt length 10 to wind itself about the reel 22 into a double ply superimposed belt coil 42 with the cross arm 44 of reaction member 32 slidably engaging and riding along the belt in the roll-up action of mechanism 20.

Referring now to FIGURES 3 through 5 there is shown demonstrator unit 50 in the form of a retractible belt support structure or stand 52 and on which is mounted a belt length that is anchored to the structure 52 and has a retractor unit 20 attached to the belt length 10, the belt length 10, retractor device 20 and structure or mounting unit 52 comprising the demonstrator unit 50 which is intended to simulate generally the mounting of a retractible seat belt means on the vehicle seat structure 2 of a vehicle as shown in FIGURE 1 for the purposes of display.

The belt and retractor support or mounting structure 52 comprises an upright part 54 and a horizontal and sloped part or seat part 56 and a base part 58. The upright part 54 has a forward facing generally vertical rectangular shaped flat wall 60 simulating a vehicle seat back cushion that has a slight forward and downward slope and the upper curved end of the wall 60 joins with a generally rectangular flat roof 63 which has a flat recessed portion 64 upon which may be attached a name plate. A flat side wall 66 extends from the roof on each side of the structure or stand 52 and is generally rectangular in shape but does have a slightly forward and downward sloping forward edge and a slightly rearward and downward sloping rearward edge and its face slopes downward and outward slightly.

Each wall 66 joins with the base part 58 and with flat rear wall 68 and the forward wall 60. The rear wall 68 slopes rearwardly like the front wall 60 slopes forwardly and connects with the base part 58, the roof 63, each side wall 66 and a raised wall portion 70 in the base part 58, the undersurface of the wall 70 receiving the anchor end 14 of the belt length 10 by fasteners 74. The horizontal and sloped part or seat part 56 extends forwardly from the front wall or back rest 60 and comprises a structure elevated above the base part 58 and has a horizontal flat wall 75 simulating a vehicle seat cushion connecting with the front wall 60 and a forward downward sloping wall 76 that practically merges with the base part 58 at the forward end thereof but is slightly above in relief. The seat part 56 standing in elevated relief adjacent the base part 58 has a pair of upright side walls 78, 78, the rearward portion 80 of each merging with the base and the side wall and the forward portion 82 of each tapering forwardly to the base part and extending in slight outward slope fashion to join laterally also with the base part 58. The base part 58 comprises a flat horizontal rectangular wall extending around the periphery of the seat and upright structure or seat 56 and has two sides, one front and one rear ledge portions 84, 86, 88 and 90 respectively defining it, the rearward ledge portion 90 having a semi-round portion or tab 92 with an opening 94 adjacent the anchor recess 70 for hanging the unit 50 from the desk or wall or the like. The wall parts of the stand 52 define a hollow interior of reverse contoured interior surface to the exterior surface as the device is made from a stamping, die cast or the like. The anchor end of the belt length 10 is attached to the underside recess surface of the rear ledge 90 of the base by the fasteners 74. A strip of material in the form of a friction grip 95 extends over the recess and is attached to underside 96 of rear ledge part 90. The underside 97 of the forward base ledge 88 has a similar friction grip 98 attached thereto, the two friction grips 95, 98 aiding in preventing slipping or sliding of the stand 52 when the belt length 10 with the retractor device 20 is operated. An elongated aperture 99 or opening with round corners extends transversely between the curved juncture of the upright front wall 60 and horizontal wall part 75 of the seat part 56 an extent slightly less than the width of the horizontal wall portion 75 and front wall 60 which are the same extent, with approximately half the aperture 99 being at lower end of the front upright wall 60 and the other half being in the horizontal wall part 75, the belt length 14 extending through the aperture 99.

It is noted that the corners, edges and junctures of all surfaces are generally round or curved in character.

*Operation*

The belt length 10 has its one end 14 anchored in the fastening means 74 and extends therefrom and out of the inside of the upright part 54 of the stand 52 through aperture 99 into a double ply coil about the retractor unit 20 with the reaction cross arm 44 of the retractor unit 20 extending through the aperture 99 into the upright part surface 60. The parts 54, 60 act as a back rest or stop that simulates the back rest of a vehicle, the belt length 10 engaging the edge of the aperture 99 in wall 60 and the cross arm 44 engaging the top of the belt length 10 between the upright parts 54, 60 while the bottom of the coil rests on the horizontal seat portion 75. The forward portion or the free end 16 of the belt length 10 is grasped by the hand of the operator into position shown by dotted line (see FIGURE 4) and is pulled outwardly unrolling the belt length 10 into an extended position with movement of retractor and reaction arm away from the back rest. Release of pressure on the free end 16 of the belt length 10 allows the belt length 10 to be retracted to a position where the belt length rolls in a double ply coil with each end of the belt length rolling together at the same time upon one another (see FIGURE 4).

The rate or speed of extension and retraction of the belt length 10 may be partly controlled by the degree of pressure exerted against the belt free end 16 in holding the free end 16 against sloping surface 76 (see FIGURE 4, solid line position of free end of belt length 10) which surface 76 and especially the front edge of base 58 can act as a belt brake means. The friction pads or grips 95, 98 prevent the stand 52 from slipping on the stand supporting surface when the other hand of the operator is held on the top 63.

The foregoing detailed description has been given for clearness of understanding and no unnecessary limitations should be understood therefrom for modifications will be obvious to those skilled in the art.

What is claimed is:

1. A stand adapted to support a demonstrator sample of a vehicle seat belt having forward and rearward terminal portions and rollable into a coil by an attached belt retractor mechanism, said stand including, an upright portion having a forward generally vertical surface simulating a vehicle seat back cushion, a forward generally plateau portion extending above the base portion and below the level of the upright portion and simulating a vehicle horizontal seat cushion, said plateau portion having a generally horizontal surface joining with the vertical surface and having an aperture in the junction of said surfaces, and said plateau portion having a downwardly sloping surface extending forwardly from the horizontal surface, said aperture being adapted to receive the rear terminal portion of the seat belt therethrough, means for attaching the rear terminal portion of the seat belt adjacent said upright portion, said aperture being smaller than the retractor mechanism to prevent passing of the retractor mechanism with the belt coil through the aperture, said vertical and horizontal surfaces having portions proximate the aperture defining a stop for the retractor mechanism and coil thereon, said downwardly sloping surface being adapted for engagement with the forward terminal portion of the seat belt to act as a brake on the undersurface of the forward terminal portion of the seat belt as the same is to be reeled up by the retractor mechanism.

2. A stand adapted to support a demonstrator sample of a vehicle seat belt having forward and rearward terminal portions and rollable into a coil by an attached belt retractor mechanism, said stand including interconnected rear upright and forward plateau portions, said upright portion having a generally vertical wall simulating a vehicle back rest and said plateau portion having a generally horizontal belt receiving wall below the level of the vertical wall and simulating a vehicle seat, said stand being provided with a belt receiving aperture, the aperture being adapted to receive part of the rear terminal portion of the seat belt therethrough and being smaller than the retractor mechanism to prevent passage of the mechanism and coil through the aperture.

3. A demonstrator for a vehicle safety belt providing for the actual ready extension and retraction operation of a safety seat belt roller, comprising means defining an elongated base, a rearwardly located upright portion having a forward surface functioning to simulate the seat back cushion at a position located intermediate the end of said base portion, a raised portion on said base lying below the top elevation of said upright portion and extending longitudinally of said base and functioning as the generally horizontal seat portion, said portions having an opening proximate the juncture thereof adapted to receive the passage therethrough of one end of a seat belt, means for fastening said end against the lower portion of said upright portion, said seat portion of said stand terminating in an inclined forward portion adapted to function to regulate the speed of retraction of the opposite end of said belt, the area of said upright portion and said seat portion proximate said opening adapted to function as a stop means for a belt rolled up upon the retracting roller.

4. In a demonstrator stand particularly adapted for a vehicle seat belt retractor mechanism of the belt roll up type and belt thereon, means defining an elongated supporting base, means defining a first raised portion located generally adjacent to one side of the transverse center of said base and having a forward generally vertically extending surface corresponding to the seat back portion of the vehicle, a second raised portion of less elevation than said first raised portion merging with said forward surface and corresponding to the generally horizontal seat portion of the vehicle, said portions having an opening at the point of juncture thereof corresponding to the opening between the back and seat portions in a vehicle seat, a spring loaded roll up mechanism having a belt rolled up thereon adapted to rest at said opening against said back and seat portions with the inner terminal portion of said belt protruding through said opening, means attaching the inner terminal portion of said belt to said demonstrator stand, said roll up mechanism having a torque reaction member extending across the inner portion of said belt in engagement therewith and locatable within said opening in the rolled up condition of said belt, said second raised portion having a forwardly downwardly extending ramp generally merging with said base portion and functioning as a surface for slidably guiding the outer terminal portion of said belt as it is withdrawn and returned to the roll up mechanism and functioning both to guide said belt and to facilitate the control thereof.

5. The invention according to claim 4 and said base portion being provided with nonslip means and said ramp imparting a component force at right angles to said base to inhibit the movement of said demonstrator as said belt is withdrawn and retracted.

References Cited by the Examiner
UNITED STATES PATENTS

| | | | |
|---|---|---|---|
| 1,313,644 | 8/1919 | Simon | 242—107 |
| 2,814,504 | 11/1957 | Campbell | 297—388 |

FRANK B. SHERRY, *Primary Examiner.*